US012613082B2

(12) United States Patent
Branco Ferreira et al.

(10) Patent No.: US 12,613,082 B2
(45) Date of Patent: Apr. 28, 2026

(54) METHOD AND SYSTEM FOR INTERCEPTING AND CONTROLLING TARGET-DRONES

(71) Applicant: SWATTER COMPANY, LDA, Lisbon (PT)

(72) Inventors: Renato Branco Ferreira, Sertã (PT); João Filipe De Quadros Gaspar, Praia da Vitoria (PT); Pedro Joaquim Amaro Sebastião, Lisbon (PT); Nuno Manuel Branco Souto, Lisbon (PT)

(73) Assignee: SWATTER COMPANY, LDA, Lisbon (PT)

( * ) Notice: Subject to any disclaimer, the term of this patent is extended or adjusted under 35 U.S.C. 154(b) by 180 days.

(21) Appl. No.: 18/293,436

(22) PCT Filed: Aug. 5, 2021

(86) PCT No.: PCT/IB2021/057202
§ 371 (c)(1),
(2) Date: Jan. 30, 2024

(87) PCT Pub. No.: WO2023/007233
PCT Pub. Date: Feb. 2, 2023

(65) Prior Publication Data
US 2025/0116488 A1     Apr. 10, 2025

(30) Foreign Application Priority Data
Jul. 30, 2021     (PT) .......................................... 117379

(51) Int. Cl.
*F41H 11/02*          (2006.01)
*G05D 1/225*          (2024.01)
(Continued)

(52) U.S. Cl.
CPC ............. *F41H 11/02* (2013.01); *G05D 1/225* (2024.01); *H04K 3/45* (2013.01); *H04K 3/65* (2013.01);
(Continued)

(58) Field of Classification Search
None
See application file for complete search history.

(56)          References Cited

U.S. PATENT DOCUMENTS 10,044,465  B1 *  8/2018   Hetsko ................ F41H 13/0075
2018/0270657  A1 *  9/2018   Amisano ............. H04W 12/069
(Continued)

FOREIGN PATENT DOCUMENTS

DE          102015008256 A1 * 12/2016  ............... H04K 3/92
KR          102194734 B1 * 12/2020  ............. G01S 17/50
(Continued)

OTHER PUBLICATIONS

Translation of DE_102015008256_A1_M.pdf (Year: 2016).*
Translation of KR_102194734_B1_M.pdf (Year: 2020).*
Translation of KR_102228579_B1_M.pdf (Year: 2021).*

*Primary Examiner* — Peter D Nolan
*Assistant Examiner* — Michael F Whalen
(74) *Attorney, Agent, or Firm* — Rivka Friedman

(57)          ABSTRACT

The present application relates to a method and a system for intercepting and controlling target-drones (2), allowing to control the target-drone's flight route (4), causing it to land in a predetermined landing position. For that purpose, the method of the invention provides the configuration of flight routes (4) for controlling the target-drone's flight path in order to direct it to the landing position, without causing any physical damage to the target-drone (1). This control is achieved by using police-drones (1) which are adapted to transmit redirection signals (3) used as a way to program a
(Continued)

new flight route (4) for the at least one target-drone (2) to a landing position.

19 Claims, 1 Drawing Sheet

(51) Int. Cl.
    *H04K 3/00*            (2006.01)
    *H04L 9/40*            (2022.01)
    *B64U 101/16*       (2023.01)
    *G05D 109/20*      (2024.01)

(52) U.S. Cl.
    CPC ........... *H04K 3/90* (2013.01); *H04L 63/0861*
        (2013.01); *B64U 2101/16* (2023.01); *B64U*
        *2201/20* (2023.01); *G05D 2109/20* (2024.01)

(56)            References Cited

U.S. PATENT DOCUMENTS

| | | | | |
|---|---|---|---|---|
| 2020/0108926 A1* | 4/2020 | Smith | ..................... | F41H 11/02 |
| 2021/0012668 A1* | 1/2021 | Parker | ..................... | G08G 5/26 |
| 2021/0047034 A1* | 2/2021 | Kim | ......................... | G08G 5/26 |
| 2021/0302533 A1* | 9/2021 | Parker | .................... | G01S 13/88 |
| 2022/0026578 A1* | 1/2022 | Pritchard | ................ | G01S 19/29 |
| 2022/0317312 A1* | 10/2022 | Sharma | .................. | H04W 4/40 |
| 2023/0095085 A1* | 3/2023 | Kerseboom | ............. | G08G 5/26 |
| | | | | 701/16 |

FOREIGN PATENT DOCUMENTS

| | | | | | |
|---|---|---|---|---|---|
| KR | 102228579 B1 * | 3/2021 | ............ | G06V 40/10 |
| WO | WO-2018044231 A1 * | 3/2018 | .............. | H04K 3/45 |

* cited by examiner

METHOD AND SYSTEM FOR INTERCEPTING AND CONTROLLING TARGET-DRONES

FIELD OF THE INVENTION

The present invention relates to detection and interception of drones or remotely controlled aircrafts within the vicinity of restricted areas.

PRIOR ART

An unmanned aerial vehicle, commonly known as a drone, is an aircraft without any human pilot, crew or passengers on board. The flight of drones may operate under remote control by a human operator, as remotely-piloted aircraft, or with various degrees of autonomy, such as autopilot assistance, up to fully autonomous aircraft that have no provision for human intervention. Drones have become popular in recent years due to the availability of relatively cheap recreational models with improved flight characteristics that can be controlled by almost anyone. Because of that, regulatory bodies around the world are developing unmanned aircraft system traffic management solutions to better integrate drones into airspace. As a consequence, the use of drones is becoming increasingly regulated by the national aviation authority of individual countries. However, media reports of negligent, criminal, and/or malicious drone use around airports, military bases, and prisons have become a common occurrence. For this reason, there are systems that aim to protect high security areas, which may use different protection schemes.

As an example, document US20190285388A1 discloses a system operative to down a target-drone comprising a pro-cessor-controlled interceptor drone bearing a processor-controlled flexible elongate intercepting agent cannon and an onboard processor to receive sensed wind conditions and configured to track the target drone including at least once, when said wind conditions exist, guiding the interceptor drone to a firing position and commanding the cannon to fire streamer rolls, once said firing position is achieved, thereby to use the flexible elongate intercepting agent to down target drones. Document KR102034494B1 has a similar approach but the interceptors are projected to fire a catching net instead of streamer rolls in order to neutralize the target-drone.

In a different approach, document KR102001181B1 describes a shooting drone, which flies toward a target-drone and emits a jamming signal that prevents reception of GPS signals and communication frequencies, and which prevents damage due to the emitted jamming signal. The drone for downing target-drones, according to the referred document, comprises: a flight control unit provided inside a body of the drone flying based on a control signal generated and trans-mitted by a controller manually controlled by a user and controlling the flight of the drone based on the control signal transmitted from the controller; a jammer mounted at a distance from a lower part of the body of the drone to emit a jamming signal toward an unlicensed drone in flight; and a jammer control unit controlling the jammer based on aiming and firing signals from the controller. A similar approach is also described in KR20200099818A which relates to an anti-drone responding system that enables responses and defence with respect to target-drones invading a restricted area. The system uses police-drones adapted to identify one or more target-drones and to transmit jamming signals by detecting a frequency and generating a disturbing frequency signal for incapacitating the target-drone.

As such, the state of the art discloses systems that allow to control the airspace of restricted areas, preventing their access by target-drones, using police-drones that, either by means of firing physical elements such as stream rollers or catching nets, or by transmitting jamming signals are able to incapacitate and neutralize the invading drone, which in many cases leads to its total destruction and/or the need for repair. However, notwithstanding in such restricted areas the flight of drones is strictly restricted, there are occasions when a target-drone is inadvertently or intentionally pen-etrated into restricted areas. For this situation a destructive approach is not adequate, so the state of the art fails to disclose a strategy for the protection of restricted areas that is equally effective but that does not destroy or cause physical damage to the target-drone.

The present solution intended to innovatively overcome such issues.

SUMMARY OF THE INVENTION

It is therefore an object of the present invention a method for intercepting and controlling target-drones, which allows to control the target-drone's flight route, causing it to land in a predetermined landing position.

For that purpose, the method of the invention provides the configuration of flight routes for controlling the target-drone's flight path in order to direct it to the landing position, without causing any physical damage to the target-drone. This control is achieved by using police-drones which are adapted to transmit redirecting signals to the target-drone, as way to program a new flight route for the at least one target-drone to a landing position. The redirecting signals include spoofing signals.

It is also an object of the present invention a system for intercepting and controlling target-drones, adapted to oper-ate in accordance with the method of the invention.

DETAILED DESCRIPTION

Figure 1:
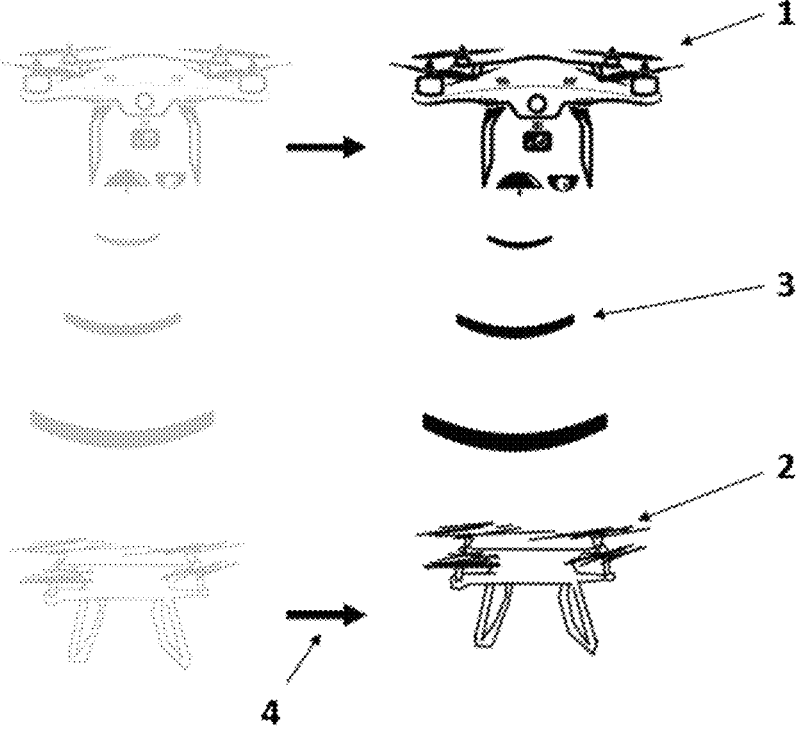
FIG. 1—representation of an embodiment of the method of the invention, wherein the reference signs represent:
1—police-drone;
2—target-drone;
3—redirection signals;
4—new flight route for the target-drone.
Figure 2:
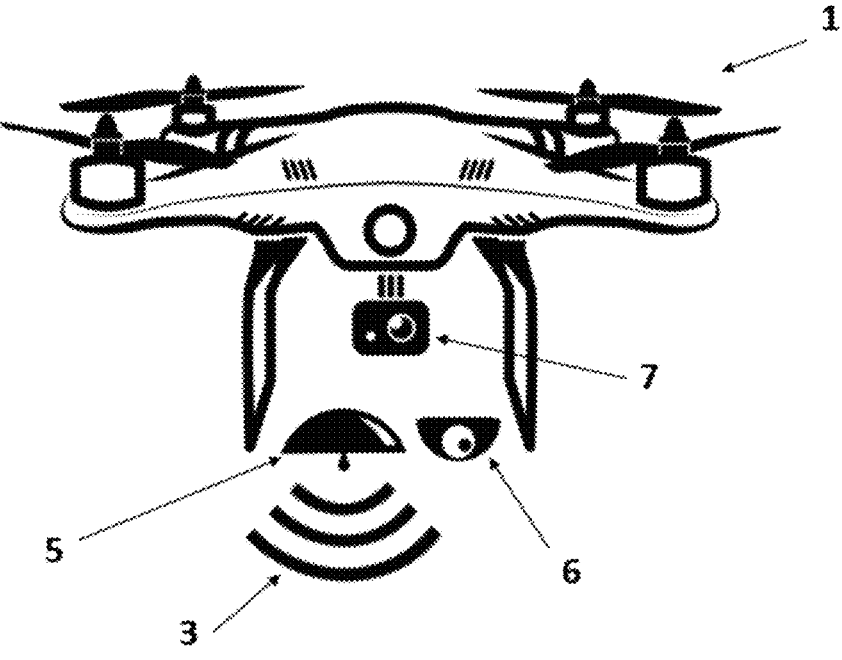
FIG. 2—representation of an embodiment of a police-drone of the invention, wherein the reference signs repre-sent:
1—police-drone;
3—redirection signals;
5—transmitting antenna;
6—vertical camera;
7—horizontal camera.

The more general and advantageous configurations of the present invention are described in the Summary of the invention. Such configurations are detailed below in accor-dance with other advantageous and/or preferred embodi-ments of implementation of the present invention.

In the context of the present application, a restricted area is a controlled environment area or facilities that have a need to limit access for security, safety and/or privacy concerns. Said restricted areas may be entirely or partially surrounded by a no-drone zone, which means that if a drone is in the designated no-drone zone or is on a flight route toward or near the restricted area, it may be designated as hostile. In the context of the present application a drone designated as hostile is named target-drone (2). Also, in the context of the present application, a police-drone (1) is directed by the control unit of the system of the invention to intercept a target-drone (2).

The present invention relates to a method for intercepting and controlling target-drones (2). In a first step of the method of the invention, it is determined the location in space of at least one target-drone (2) that is positioned in a vicinity of or within a restricted area. In one embodiment of the method, the position of a target-drone (2) is acquired by an auxiliary detection system, such as a radar system.

In a second step of the method of the invention, at least one police-drone (1) is activated and it is displaced to an operating position in a vicinity of at least one target-drone (2). In another embodiment of the method of the invention, the displacement of a police-drone (1) to the operating position is carried out autonomously by programming a flight route. Yet in another embodiment, the police-drone (1) may continuously update the flight route by capturing video of a target-drone (2) and processing said video capture in order to detect and track said target-drone (2). Alternatively, in another embodiment of the method of the invention, the displacement of a police-drone (1) to the operating position is performed remotely under the control of a user by means of a remote controller. Yet in another embodiment, said remote controller may include a screen adapted to transmit the video signal captured by the police-drone (1), in order to help the user in his task of remotely operating the police-drone (1).

In a third step of the method of the invention, redirection signals (3) are transmitted by at least one police-drone (1) to the at least one target-drone (2). The redirection signals (3) include spoofing signals, which are configured to program a new flight route (4) for the at least one target-drone (2) to a landing position. For that purpose, in one embodiment of the method, the transmission of spoofing signals may use ephemeris files adapted to simulate a set of satellites, forming a hypothetical constellation, which are configured to generate baseband signal data streams to be transmitted in a frequency range of a satellite tracking system so as to be able to program the flight route (4) of at least one target-drone (2) to the landing position.

In one preferred embodiment of the method of the invention, the redirection signals (3) further include jamming signals. More particularly, the jamming signals are transmitted prior to the transmission of the spoofing signals.

Yet in another embodiment of the method, the redirection signals (3) further include jamming signals. More particularly, the jamming signals and the spoofing signals are transmitted simultaneously. As a consequence of this preferred configuration, the signal strength of the spoofing signals transmitted by a police-drone (1) may be decreased compared with the scenario where only spoofing signals are transmitted. In fact, even though in addition to spoofing signals also jamming signals are generated and transmitted, this particular configuration allows to achieve a better relationship between the power consumed by the police-drone (1) and the efficiency of the redirection signals (3) in redirecting the flight route (4) of the target-drone (2) for a pre-defined landing position.

In another embodiment of the method of the invention, the transmission of jamming signals involves the transmission of radio frequency signals adapted to jam terrestrial positioning signals or remote-control signals. The configuration and subsequent transmission of jamming signals implies detecting the frequency of operation of the target-drone (2) and generating a disturbing frequency signal for incapacitating the target-drone (2). Then the police-drone (1) by means of an antenna element (5) transmits the disturbing frequency signal with respect to the target-drone (2), thereby blocking remote control frequencies, image transmission frequency bands that may be used to control the flight path of the target-drone, and Global Navigation Satellite System signals.

In another embodiment of the method of the invention, the operating position is based on the location of a target-drone (2) at any time; and the operating position being defined as a position for a police-drone (1) that is at a radial distance between 3 to 10 meters from the target-drone (2).

Yet in another embodiment of the method of the invention, the operating position is defined as a position for the police-drone (1) which is at an altitude higher than the altitude of the target-drone (2). More particularly, in another embodiment of the method of the invention, the operating position is defined as a position for the police-drone (1) with the same geographic latitude and longitude coordinates as the target-drone (2) but the police-drone (1) being at an altitude higher than the altitude of the target-drone (2). This operating position proved to be more efficient for the transmission of the redirection signals (3).

In another embodiment of the method of the invention, the landing position is predetermined as a function of the restricted area, more particularly, the landing position can be inside or outside the restricted area.

The present invention also relates to a system for intercepting and controlling target-drones (2), adapted to operate in accordance with the method of the invention. The system comprises a control unit and at least one police-drone (1). The control unit comprises processing means configured to program flight routes and to monitor the position of police-drones (1) and target-drones (2).

In one embodiment of the system of the invention, the control unit is configured to program a flight route (4) for at least one target-drone (2).

In another embodiment of the system of the invention, the police-drone (1) comprises at least one or a combination of the following sensory elements: Lidar sensor, at least one camera, barometer, accelerometer, gyroscope, compass, geolocation sensor. Yet in another embodiment, the police-drone comprises at least one camera with attached gimbal. Yet in another embodiment, the police-drone comprises a horizontal camera (7) and a vertical camera (6).

In another embodiment of the system of the invention, the police-drone (1) comprises a computational module with processing capability adapted to process sensory information collected by the sensory elements.

Yet in another embodiment of the system of the invention, it further comprises an auxiliary detection system adapted to determine the position of a target-drone (2). In this embodiment, the control is being further configured to program a flight route (4) base on the position of a target-drone (2) acquired by said auxiliary detection system.

Yet in another embodiment of the system of the invention, it further comprises at least one remote controller adapted to remotely control at least one police-drone (1); said remote controller being operated by a user. Yet in another embodiment, the remote controller comprises a biometric sensor configured to identify the user operating the remote controller. In this embodiment, the control unit is additionally configured to disable the remote controller if the user identified by the biometric sensor is not a certified user. A certified user is a user that is authorized to operate a remote controller. Finally, in another embodiment of the system of the invention, the remote controller comprises a touch screen in order to improve the control operation of the police-drone (1) executed by the user.

As will be clear to one skilled in the art, the present invention should not be limited to the embodiments described herein, and a number of changes are possible which remain within the scope of the present invention.

Of course, the preferred embodiments shown above are combinable, in the different possible forms, being herein avoided the repetition all such combinations.

The invention claimed is:

1. A method for intercepting and controlling target-drones, the method comprising the following steps:

i. determining the location in space of at least one target-drone that is positioned in a vicinity of or within a restricted area;

ii. activating at least one police-drone and its displacement to an operating position in a vicinity of at least one target-drone;

iii. transmitting redirection signals by at least one police-drone to the at least one target-drone; the redirection signals being configured to program a flight route for the at least one target-drone to a landing position;

wherein, the redirection signals include spoofing signals, wherein the operating position is based on the location of a target-drone at any time; and the operating position being defined as a position for a police-drone that is at a radial distance between 3 to 10 meters from the target-drone, and wherein the operating position is defined as a position for the police-drone which is at an altitude higher than the altitude of the target-drone.

2. The method according to claim 1, wherein the redirection signals further include jamming signals; the jamming signals being transmitted prior to the transmission of spoofing signals.

3. The method according to claim 2, wherein the transmission of jamming signals involves the transmission of radio frequency signals adapted to jam terrestrial positioning signals or remote-control signals.

4. The method according to claim 1, wherein the redirection signals further include jamming signals; the jamming signals and the spoofing signals being transmitted simultaneously.

5. The method according to claim 1, wherein the position of a target-drone is acquired by an auxiliary detection system.

6. The method according to claim 5, wherein the auxiliary detection system is a radar system.

7. The method according to claim 1, wherein the displacement of a police-drone to the operating position is carried out autonomously by programming a flight route, and wherein a police-drone continuously updates the flight route by capturing video of a target-drone and processing said video capture in order to detect and track said target-drone.

8. The method according to claim 1, wherein the displacement of a police-drone to the operating position is performed remotely under the control of a user by means of a remote controller.

9. The method according to claim 1, wherein the operating position is defined as a position for the police-drone with the same geographic latitude and longitude coordinates as the target-drone.

10. The method according to claim 1, wherein the transmission of spoofing signals uses ephemeris files adapted to simulate a set of satellites forming a hypothetical constellation; the simulated set of satellites being configured to generate baseband signal data streams to be transmitted in a frequency range of a satellite tracking system so as to be able to program the flight route of at least one target-drone to the landing position.

11. The method according to claim 1, wherein the landing position is predetermined as a function of the restricted area.

12. The method according to claim 1, wherein the landing position is inside or outside the restricted area.

13. A system for intercepting and controlling target-drones, adapted to operate in accordance with the method of claim 1; said system comprising:

a control unit;

at least one police-drone;

the control unit comprising processing means configured to program flight routes and to monitor the position of police-drones and target-drones.

14. The system according to claim 13, wherein the control unit is configured to program a flight route for at least one target-drone.

15. The system according to claim 13 wherein a police-drone comprises at least one or a combination of the following sensory elements: Lidar sensor, at least one camera, barometer, accelerometer, gyroscope, compass, geolocation sensor, and wherein the police-drone comprises at least one camera with attached gimbal.

16. The system according to claim 15, wherein the police-drone comprises a horizontal camera and a vertical camera, and wherein the police-drone comprises a computational module with processing capability adapted to process sensory information collected by the sensory elements.

17. The system according to claim 13, further comprising an auxiliary detection system adapted to determine the position of a target-drone; the control unit being further configured to program a flight route base on the position of a target-drone acquired by said auxiliary detection system.

18. The system according claim 13, comprising at least one remote controller adapted to remotely control at least one police-drone; said remote controller being operated by a user, and wherein the remote controller comprises a biometric sensor configured to identify the user operating the remote controller; the control unit being additionally configured to disable the remote controller if the user identified by the biometric sensor is not a certified user.

19. The system of claim 18, wherein the remote controller comprises a touch screen.

* * * * *